US012752433B2

(12) United States Patent
Sun et al.

(10) Patent No.: US 12,752,433 B2
(45) Date of Patent: Oct. 6, 2026

(54) CONTROL DEVICE AND DETECTION SYSTEM

(71) Applicant: FANUC CORPORATION, Minamitsuru-gun (JP)

(72) Inventors: Zeyuan Sun, Minamitsuru-gun (JP); Yuta Namiki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 18/864,707

(22) PCT Filed: May 19, 2022

(86) PCT No.: PCT/JP2022/020842

§ 371 (c)(1),
(2) Date: Nov. 11, 2024

(87) PCT Pub. No.: WO2023/223503

PCT Pub. Date: Nov. 23, 2023

(65) Prior Publication Data

US 2025/0339971 A1 Nov. 6, 2025

(51) Int. Cl.
*B25J 9/16* (2006.01)
*B25J 19/02* (2006.01)

(52) U.S. Cl.
CPC ........... *B25J 9/1697* (2013.01); *B25J 9/1653* (2013.01); *B25J 19/023* (2013.01)

(58) Field of Classification Search
CPC ...... B25J 9/1697; B25J 9/1653; B25J 19/023; G05B 2219/39102; G05B 2219/40554; G05B 2219/40607
USPC ................. 700/245–264; 318/568.11–568.25
See application file for complete search history.

(56) References Cited

U.S. PATENT DOCUMENTS

| | | | | |
|---|---|---|---|---|
| 4,906,907 | A * | 3/1990 | Tsuchihashi | B25J 13/08 901/17 |
| 7,558,647 | B2 * | 7/2009 | Okazaki | B25J 9/1633 318/568.22 |
| 9,621,793 | B2 * | 4/2017 | Furihata | G01B 11/2522 |
| 11,161,239 | B2 * | 11/2021 | Ooba | B25J 9/1692 |
| 11,241,796 | B2 * | 2/2022 | Sato | B25J 9/1697 |

(Continued)

FOREIGN PATENT DOCUMENTS

| | | |
|---|---|---|
| JP | 2001277165 A | 10/2001 |
| JP | 2002329206 A | 11/2002 |

(Continued)

OTHER PUBLICATIONS

International Search Report (PCT/ISA/210) with translation and Written Opinion (PCT/ISA/237) mailed on Aug. 2, 2022, by the Japan Patent Office as the International Searching Authority for International Application No. PCT/JP2022/020842. (9 pages).

*Primary Examiner* — Jaime Figueroa
(74) *Attorney, Agent, or Firm* — BUCHANAN INGERSOLL & ROONEY PC

(57) ABSTRACT

A control device including: an image acquisition unit for acquiring, from a visual sensor, a plurality of images obtained by successively imaging a workpiece; and an object-determining unit for determining, on the basis of the plurality of images, the workpiece that is in a stationary state as an object on which work is to be carried out by industrial machinery.

6 Claims, 9 Drawing Sheets

(56) References Cited

U.S. PATENT DOCUMENTS

| | | | | |
|---|---|---|---|---|
| 11,694,048 | B2 * | 7/2023 | Yamada | G06K 7/1482 235/462.1 |
| 11,880,739 | B2 * | 1/2024 | Izaki | G06K 7/10 |
| 2002/0008141 | A1 * | 1/2002 | Ishii | G06K 7/1443 235/435 |
| 2006/0072988 | A1 * | 4/2006 | Hariki | B25J 5/02 414/282 |
| 2007/0073439 | A1 * | 3/2007 | Habibi | G05B 19/4182 700/213 |
| 2009/0105880 | A1 * | 4/2009 | Okazaki | B25J 9/1633 700/258 |
| 2012/0029686 | A1 | 2/2012 | Ban et al. | |
| 2013/0176445 | A1 | 7/2013 | Streeter et al. | |
| 2013/0211766 | A1 * | 8/2013 | Rosenberg | G01S 15/06 702/97 |
| 2015/0292863 | A1 * | 10/2015 | Furihata | H04N 23/62 348/135 |
| 2017/0173795 | A1 * | 6/2017 | Tan | B25J 9/1661 |
| 2018/0239938 | A1 * | 8/2018 | Nagata | G06K 7/10752 |
| 2018/0370023 | A1 * | 12/2018 | Ooba | B25J 15/0095 |
| 2019/0077010 | A1 * | 3/2019 | Ando | B65G 47/52 |
| 2019/0160682 | A1 * | 5/2019 | Sato | B25J 9/162 |
| 2019/0321967 | A1 * | 10/2019 | Ooba | B25J 13/085 |
| 2021/0154856 | A1 * | 5/2021 | Takai | B25J 9/1651 |
| 2022/0284208 | A1 * | 9/2022 | Yamada | G06K 7/1473 |
| 2023/0150777 | A1 * | 5/2023 | Skyum | B07C 5/36 700/245 |
| 2023/0169289 | A1 * | 6/2023 | Izaki | G06K 7/10 235/462.11 |

FOREIGN PATENT DOCUMENTS

| | | | |
|---|---|---|---|
| JP | 2012024903 | A | 2/2012 |
| JP | 2020055059 | A | 4/2020 |
| JP | 2021146404 | A | 9/2021 |

* cited by examiner

CONTROL DEVICE AND DETECTION SYSTEM

CROSS REFERENCE TO RELATED APPLICATIONS

This is the U.S. National Phase application of PCT/JP2022/020842, filed May 19, 2022, the disclosure of this application being incorporated herein by reference in its entirety for all purposes.

FIELD OF THE INVENTION

The present invention relates to a controller and a detection system.

BACKGROUND OF THE INVENTION

Robot systems configured to pick up target objects conveyed on a conveyance device and arrange them in a predetermined position or perform work for picking up target objects loaded in bulk, by using a robot, have been known. For example, PTL 1 relates to a cargo handling system by a robot and describes as follows: "For the second and subsequent picking processes, a control device 30 performs a difference check for detecting an article W of which the amount of change between a new RGB image 40b acquired from a camera 20 after the start of previous selection processing and an RGB image 40a used in previous recognition processing is equal to or less than a threshold value, performs the selection processing of selecting the article W being a next movement target from among the articles W having the amount of change equal to or less than the threshold value, and performs movement processing." (paragraph 0148).

PTL 2 relates to a storing device by a robot and describes as follows: "A target object 21 continuously conveyed on a transportation conveyor 23 is photographed by a camera 29, and a position and a posture of the target object are recognized by image processing. A conveyance distance is detected by an encoder provided for the transportation conveyor 23. Movement data about a robot is created from the recognized position and the recognized posture of the target object and, furthermore, from the detected conveyance distance, and a posture of the robot is changed to grasp the target object and store it in a storing body 49." (abstract).

PATENT LITERATURE

[PTL 1] Japanese Unexamined Patent Publication (Kokai) No. 2021-146404 A

[PTL 2] Japanese Unexamined Patent Publication (Kokai) No. 2001-277165 A

SUMMARY OF THE INVENTION

In a system for picking up workpieces loaded in bulk by a robot, and a pick-up system for detecting, by a visual sensor, workpieces separately conveyed on a transportation conveyor and picking up the detected workpiece, some workpieces being a pick-up target, such as a tablet of medicine, may require a certain period of time until the position and posture of the workpiece are stable after the workpiece is put into a container or the transportation conveyor. In the pick-up system for such a workpiece, when a robot attempts to pick up a workpiece before the position and posture the workpiece are stable, the robot fails to pick up the workpiece, which becomes the cause of occurrence of wasteful time.

One aspect of the present disclosure is a controller including: an image acquisition unit configured to acquire, from a visual sensor, a plurality of images of workpieces successively captured by the visual sensor; and a target determination unit configured to determine a workpiece in a stationary state as a target for work by an industrial machine, based on the plurality of images.

Another aspect of the present disclosure is a detection system including: a visual sensor; an image acquisition unit configured to acquire, from the visual sensor, a plurality of images of workpieces successively captured by the visual sensor; and a target determination unit configured to determine a workpiece in a stationary state as a target for work by an industrial machine, based on the plurality of images.

According to the configuration described above, a workpiece in a stationary state can be set as a pick-up target, a possibility of pick-up failure can thus be reduced, and a cycle time of work by an industrial machine can be shortened.

The objects, the features, and the advantages, and other objects, features, and advantages will become more apparent from the detailed description of typical embodiments of the present invention illustrated in accompanying drawings.

DETAILED DESCRIPTION OF EMBODIMENTS OF THE INVENTION

Figure 1:
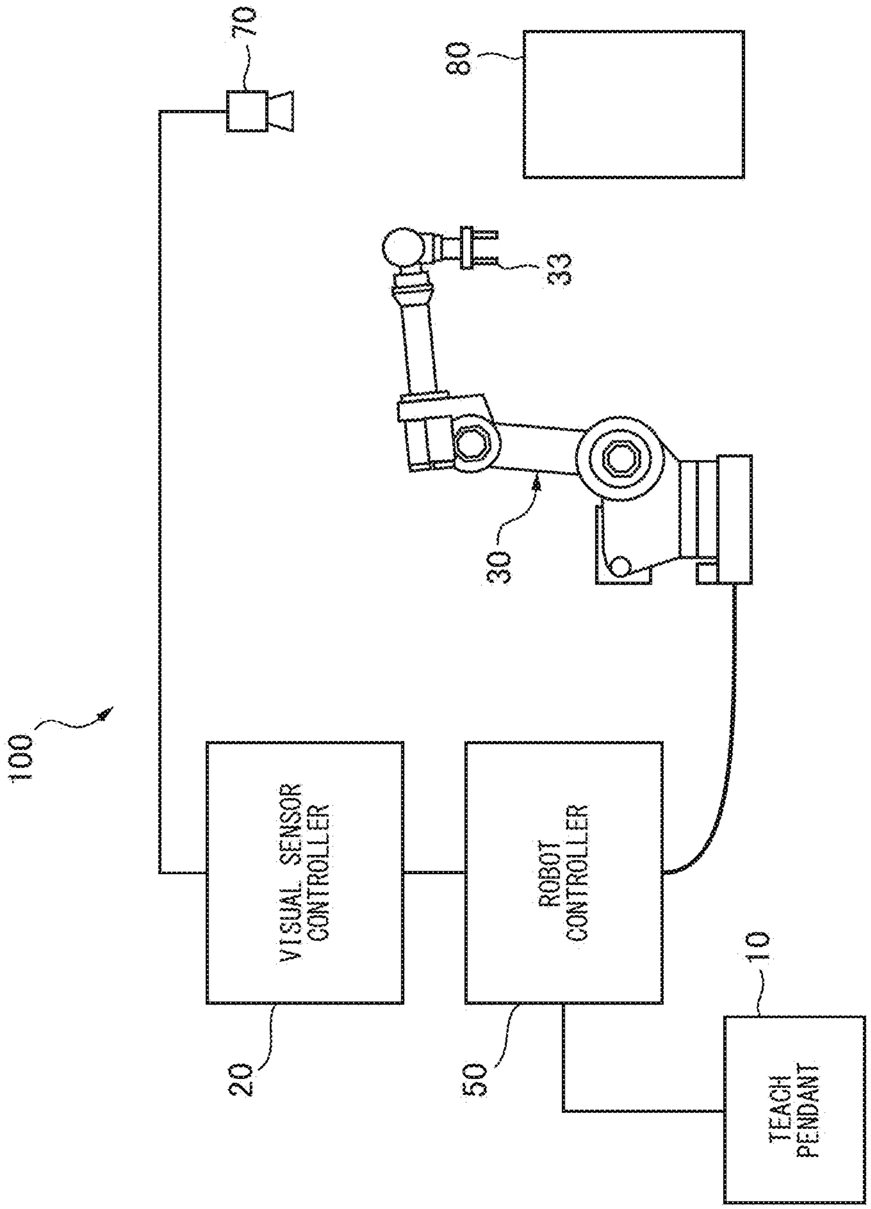
FIG. 1 is a diagram illustrating an apparatus configuration of a detection system according to an embodiment.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

FIG. 1 is a diagram illustrating an apparatus configuration of a detection system 100 according to an embodiment. The detection system 100 is configured as a robot system for detecting a workpiece by a visual sensor 70 and performing handling of the workpiece. As illustrated in FIG. 1, the detection system 100 includes a robot 30, a robot controller 50 that controls the robot 30, a teach pendant 10 connected to the robot controller 50, the visual sensor 70, and a visual sensor controller 20 that controls the visual sensor 70. The visual sensor controller 20 is connected to the robot controller 50. Further, a peripheral apparatus 80 is arranged in the detection system 100. The peripheral apparatus 80 is, for example, a container in which workpieces are placed, a conveyance device that conveys workpieces, and the like.

An example in which the robot 30 is a vertical articulated robot is described herein, but a robot of various types such as a parallel link robot and a dual arm robot may be used as the robot 30 according to the work target. The robot 30 can perform the desired work by an end effector attached to a wrist portion. The end effector is an external device, which is exchangeable according to use, and is, for example, a hand, a tool, and the like. FIG. 1 illustrates an example in which a hand 33 as one example of the end effector is used. The hand may be configured to grasp a target object by a grasping hook, or may be configured to adsorb and hold a target object by an adsorption unit. In the detection system 100, the robot 30 performs handling of workpieces by using the hand 33. It should be noted that the handling may include various types of work by the robot such as picking and placing, housing into a container and a case, and palletizing.

In the present embodiment, it is assumed that the visual sensor 70 is a camera that can capture a two-dimensional image and is fixed, in a workspace, at a position where the camera can capture an image of a workpiece. It should be noted that a three-dimensional sensor that can acquire a distance image or a three-dimensional point group may be used as the visual sensor 70. The visual sensor 70 may be attached to an arm tip portion of the robot 30.

The visual sensor controller 20 has a function of controlling the visual sensor 70 and a function of performing image processing on an image captured by the visual sensor 70. The visual sensor controller 20 holds model data about a target object, and has a function of performing detection processing of detecting a target object by pattern matching between an image of the target object in a captured image and the model data.

FIG. 1 illustrates an example in which the visual sensor controller 20 is configured as a device provided separately from the robot controller 50, but the function as the visual sensor controller 20 may be implemented on the robot controller 50.

Some workpieces being a target for handling by the robot 30, such as a tablet of medicine, have a position and a posture that are not stable immediately after the workpieces are placed in a container or put in a conveyance device, and that become stable after a certain period of time. Picking-up of a workpiece is desirably performed in a state where the workpiece is stable. For a workpiece placed in a container or put in a conveyance device, the detection system 100 according to the present embodiment can set, as a target for pick-up, a workpiece in a stable state, and achieve high efficiency of pick-up work.

Figure 2:
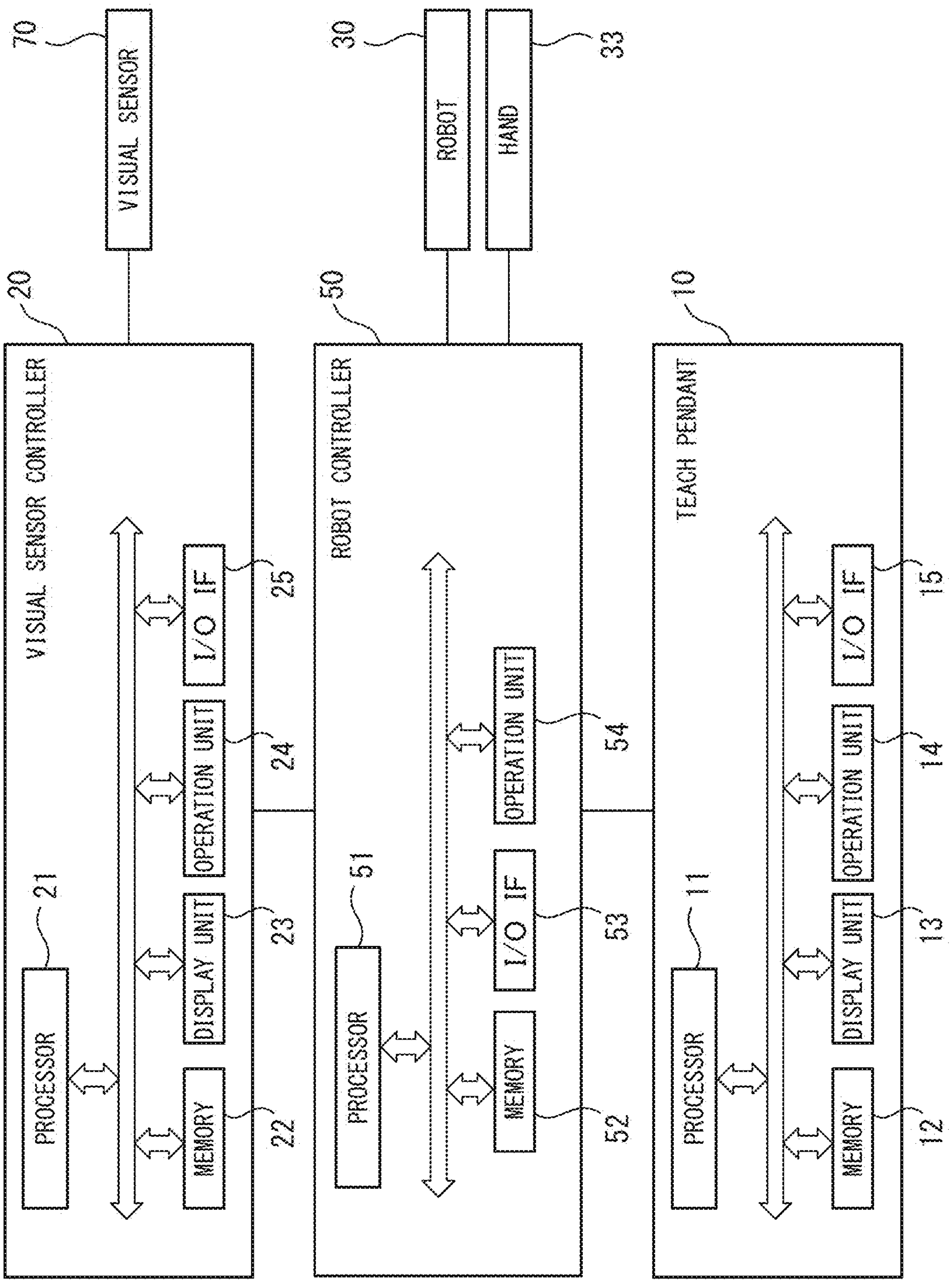
FIG. 2 is a diagram illustrating a hardware configuration example of a visual sensor controller, a robot controller, and a teach pendant.

FIG. 2 is a diagram illustrating a hardware configuration example of the visual sensor controller 20, the robot controller 50, and the teach pendant 10. As illustrated in FIG. 2, the visual sensor controller 20 may have a configuration as a common computer in which a memory 22 (such as a ROM, a RAM, and a non-volatile memory), a display unit 23, an operation unit 24 including various input devices, an input/output interface 25, and the like are connected to a processor 21 via a bus. The input/output interface 25 may include various input/output interfaces such as a network interface, a serial communication interface, and a memory card interface. The visual sensor controller 20 may be configured as a special-purpose device specializing in a function as a visual sensor controller, or may be formed of a general-purpose computer such as a personal computer.

The robot controller 50 may have a configuration as a common computer in which a memory 52 (such as a ROM, a RAM, and a non-volatile memory), an input/output interface 53, an operation unit 54 including various operation switches, and the like are connected to a processor 51 via a bus. The input/output interface 53 may include various input/output interfaces such as a network interface, a serial communication interface, and a memory card interface.

The teach pendant 10 is used as a device for teaching the operation to the robot 30, and performing an operation input and a screen display for performing various types of setting. The teach pendant 10 may have a configuration as a common computer in which a memory 12 (such as a ROM, a RAM, and a non-volatile memory), a display unit 13, an operation unit 14 formed of an input device such as a keyboard (or a software key), an input/output interface 15, and the like are connected to a processor 11 via a bus. The input/output interface 15 may include various input/output interfaces such as a network interface, a serial communication interface, and a memory card interface. The teach pendant 10 may be formed of a tablet terminal, a smartphone, and other information processing devices.

Figure 3:
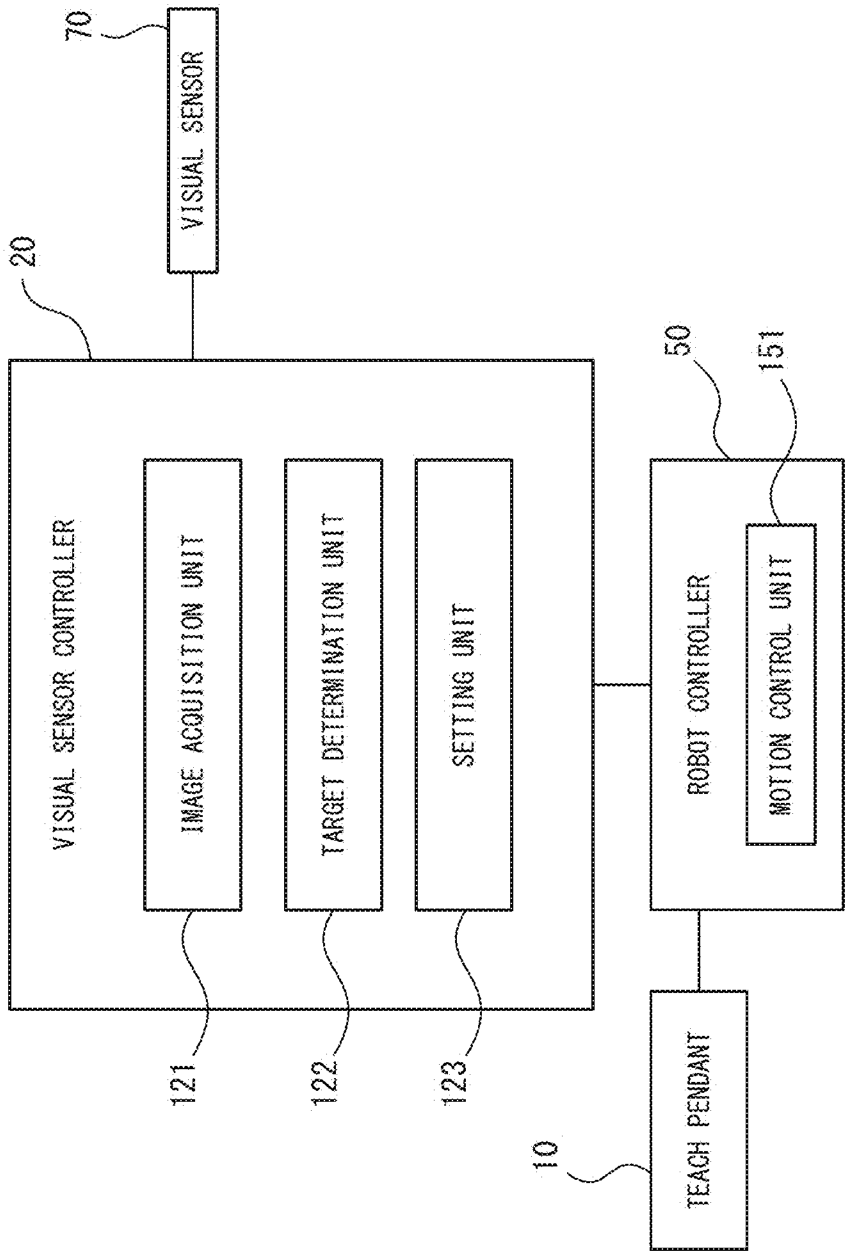
FIG. 3 is a functional block diagram of the visual sensor controller and the robot controller.

FIG. 3 is a functional block diagram of the visual sensor controller 20 and the robot controller 50. As illustrated in FIG. 3, the visual sensor controller 20 includes an image acquisition unit 121, a target determination unit 122, and a setting unit 123. The robot controller 50 includes a motion control unit 151 that controls a motion of the robot 30 based on a motion program.

The image acquisition unit 121 controls the visual sensor 70 and acquires an image captured by the visual sensor 70. In the present embodiment, the image acquisition unit 121 acquires a plurality of images of workpieces successively captured by the visual sensor 70.

The target determination unit 122 extracts a workpiece in a stationary state, based on the plurality of images acquired from the visual sensor 70, and determines the workpiece as a target for work by the robot 30. The target determination unit 122 notifies the robot controller 50 of the workpiece determined as the target for the work by the robot.

The setting unit 123 accepts an input of various types of setting (for example, a parameter used for image processing) for performing processing of extracting a workpiece in a stationary state by the target determination unit 122.

Hereinafter, two specific examples of the operation for the target determination unit 122 to determine a workpiece in a stationary state as a target for pick-up by the robot 30 will be described. In the examples, it is assumed that a workpiece is a tablet of medicine, and the peripheral apparatus 80 is a container in which the workpieces are put.

First Example

Figure 4:
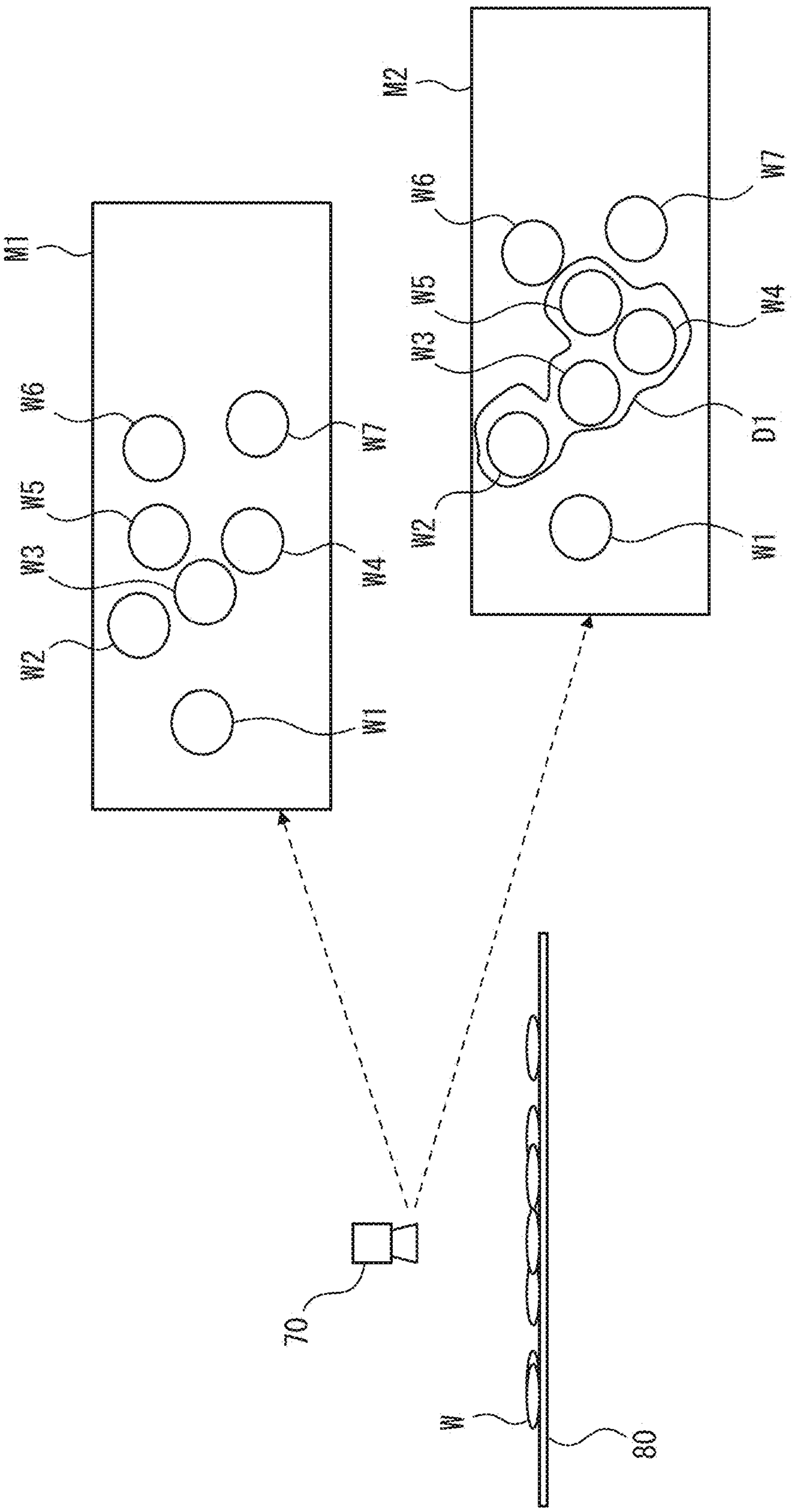
FIG. 4 is a diagram illustrating image processing for a target determination unit to determine a workpiece in a stationary state as a pick-up target according to a first example.
Figure 5:
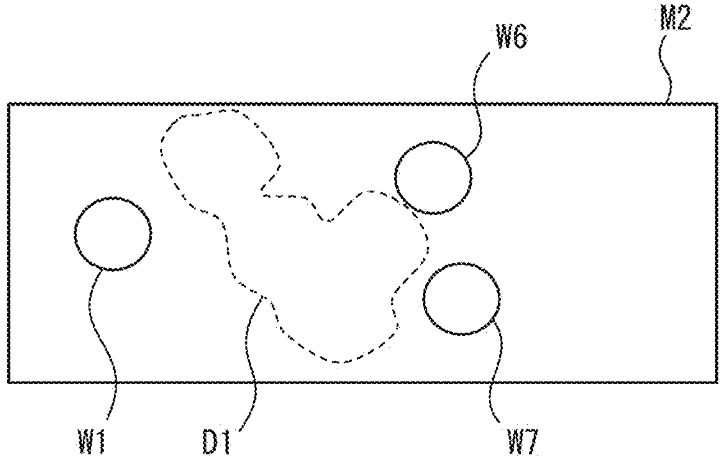
FIG. 5 is a diagram illustrating image processing for the target determination unit to determine a workpiece in a stationary state as a pick-up target according to the first example.
Figure 6:
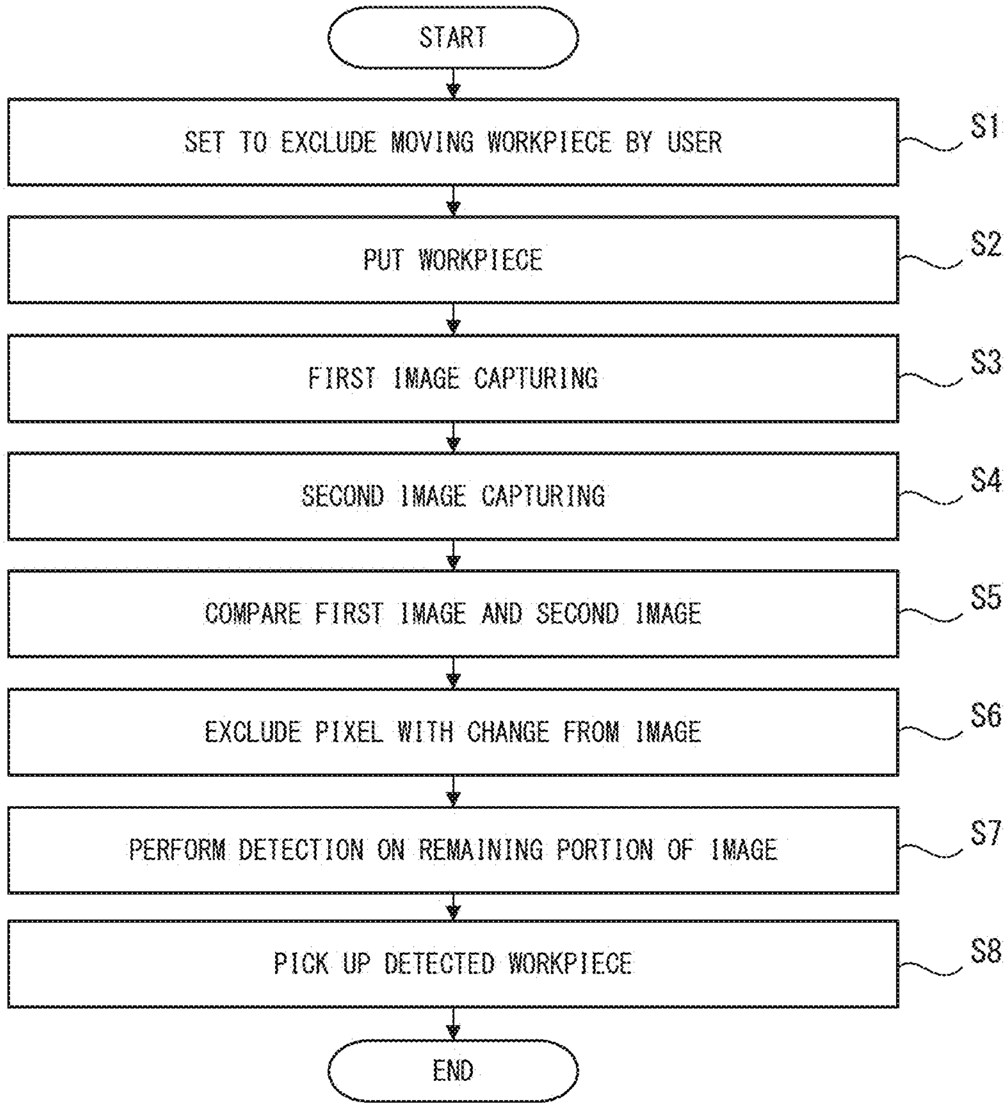
FIG. 6 is a flowchart illustrating a determination operation of a pick-up target according to the first example.

Hereinafter, a first example will be described with reference to FIGS. 4 to 6. FIGS. 4 and 5 are diagrams illustrating image processing for the target determination unit 122 to determine a workpiece in a stationary state as a pick-up target according to the first example. FIG. 6 is a flowchart illustrating a determination operation of a pick-up target according to the first example. The determination operation of a pick-up target according to the first example will be described with reference to the flowchart in FIG. 6.

First, a user performs setting for excluding a moving workpiece from a target of a pick-up operation by the robot 30 (i.e., for setting a workpiece in a stationary state as a pick-up target) (step S1). The setting is accepted via, for example, a user interface (UI) screen provided by the setting unit 123.

Next, as illustrated in FIG. 4, workpieces W being tablets of medicine are put in the peripheral apparatus (container) 80 (step S2). The visual sensor 70 is arranged at a position where the visual sensor 70 can capture an image of the workpieces W on the peripheral apparatus (container) 80. The visual sensor 70 successively captures images of the workpieces W. In this way, first image capturing (step S3) and second image capturing (step S4) for the workpieces W are performed. As illustrated in FIG. 4, it is assumed that an image acquired by the first image capturing is an image M1, and an image acquired by the second image capturing is an image M2. Seven workpieces W1 to W7 are captured in each of the images M1 and M2.

The target determination unit 122 compares the two images M1 and M2, and thus extracts, as a region with a movement on the image, a region with a change in a pixel value between both of the images (step S5). In the present example, a pixel region of the four workpieces W2 to W5 is extracted as a region with a change between both of the images. The target determination unit 122 determines, as a non-target region D1 for detection, a region containing the four workpieces W2 to W5 by adding a predetermined margin to the pixel region of the moving workpiece. The non-target region D1 for detection is a region that is not a target for detection processing for detecting a workpiece.

It should be noted that, in a situation where the visual sensor 70 is mounted on the robot 30 and images of workpieces are captured by the visual sensor 70 while the robot 30 is moving, before pixel values of two images successively captured in step S5 are compared, conversion of an image (translation, rotation, and the like of an image) may be performed as a preprocessing in such a way that the same region is seen in the two images, based on the image capturing position of the visual sensor 70 at which the visual sensor captures an image of the workpieces. Also, in a situation where workpieces are conveyed on a conveyance device and the visual sensor 70 fixed in a workspace captures images of the workpieces conveyed on the conveyance device, before pixel values of two images successively captured in step S5 are compared, conversion of an image (translation, rotation, and the like of an image) may be performed as a preprocessing in such a way that the same region on a conveyor belt is seen in the two images, based on the conveyance speed and the like of the conveyance device.

The target determination unit 122 performs processing of excluding the non-target region D1 for detection from the image M2 being the latest image (step S6). Herein, the processing of excluding the non-target region D1 for detection from the image M2 is processing for setting the non-target region D1 for detection to be an invalid pixel in the image M2, or processing of performing mask processing on pixels included in the non-target region D1 for detection in the image M2. When the former processing is performed, the target determination unit 122 may perform the detection processing on the remaining image region defined on the image M2 in a state where the non-target region D1 for detection is excluded from the image M2 (step S7). In this case, the non-target region D1 for detection is excluded from a target for the detection processing, and thus time required for the detection processing can be shortened.

A case where the latter processing is performed will be described. FIG. 5 illustrates a state where the non-target region D1 for detection is masked (for example, colored by a background color) in the image M2. The target determination unit 122 performs the detection processing for detecting a workpiece on the image M2 subjected to such mask processing, for example (step S7). By thus performing the detection processing on the image M2 in a state where a region including a moving workpiece is masked, time required for the detection processing can be shortened. More specifically, by masking a region including a moving workpiece, such a processing load that a score value (calculation value of a degree of similarity between a target in an image and model data) is calculated in the detection processing does not occur for a pixel in the masked region, and thus time required for the detection processing can be shortened.

By the detection processing, the workpieces W1, W6, and W7 are determined as workpieces being a pick-up target, and notified to the robot controller 50. The motion control unit 151 of the robot controller 50 performs a pick-up operation on the workpieces W1, W6, and W7 notified from the target determination unit 122 (step S8).

In such a manner, according to the first example, by performing the detection processing in a state where a region including a moving workpiece is excluded from an image in which workpieces are captured, a workpiece in a stationary state can be determined as a pick-up target by the robot 30. In other words, a possibility that the robot 30 attempts to perform the pick-up operation on a moving workpiece and fails can be reduced, and the cycle time of the entire pick-up operation can be shortened. Further, by performing the detection processing in a state where a region including a moving workpiece is excluded from an image in which workpieces are captured, time required for the detection processing can be shortened, and the cycle time of the entire pick-up operation can be shortened.

Second Example

Figure 7:
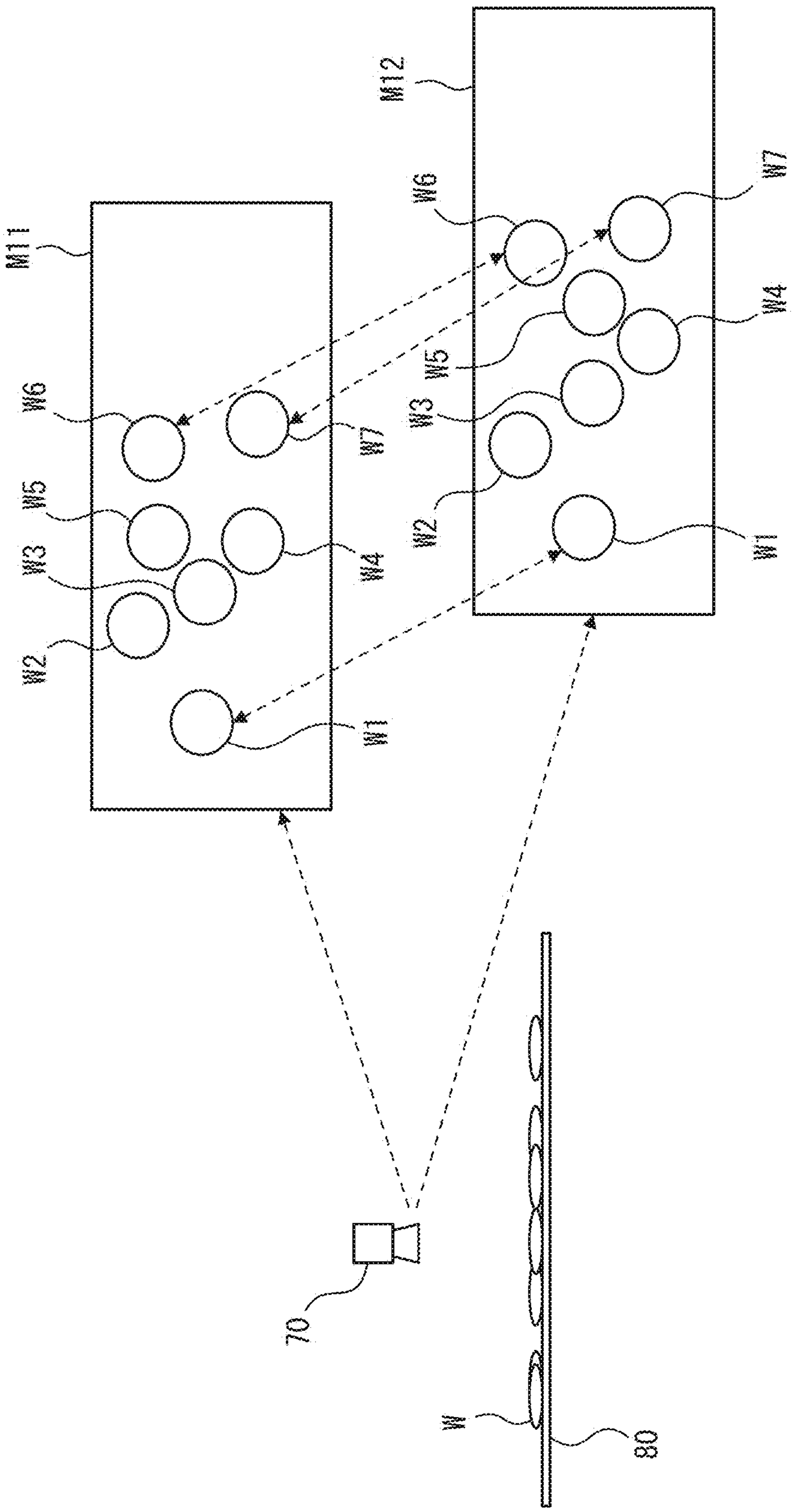
FIG. 7 is a diagram illustrating image processing for a target determination unit to determine a workpiece in a stationary state as a pick-up target according to a second example.
Figure 8:
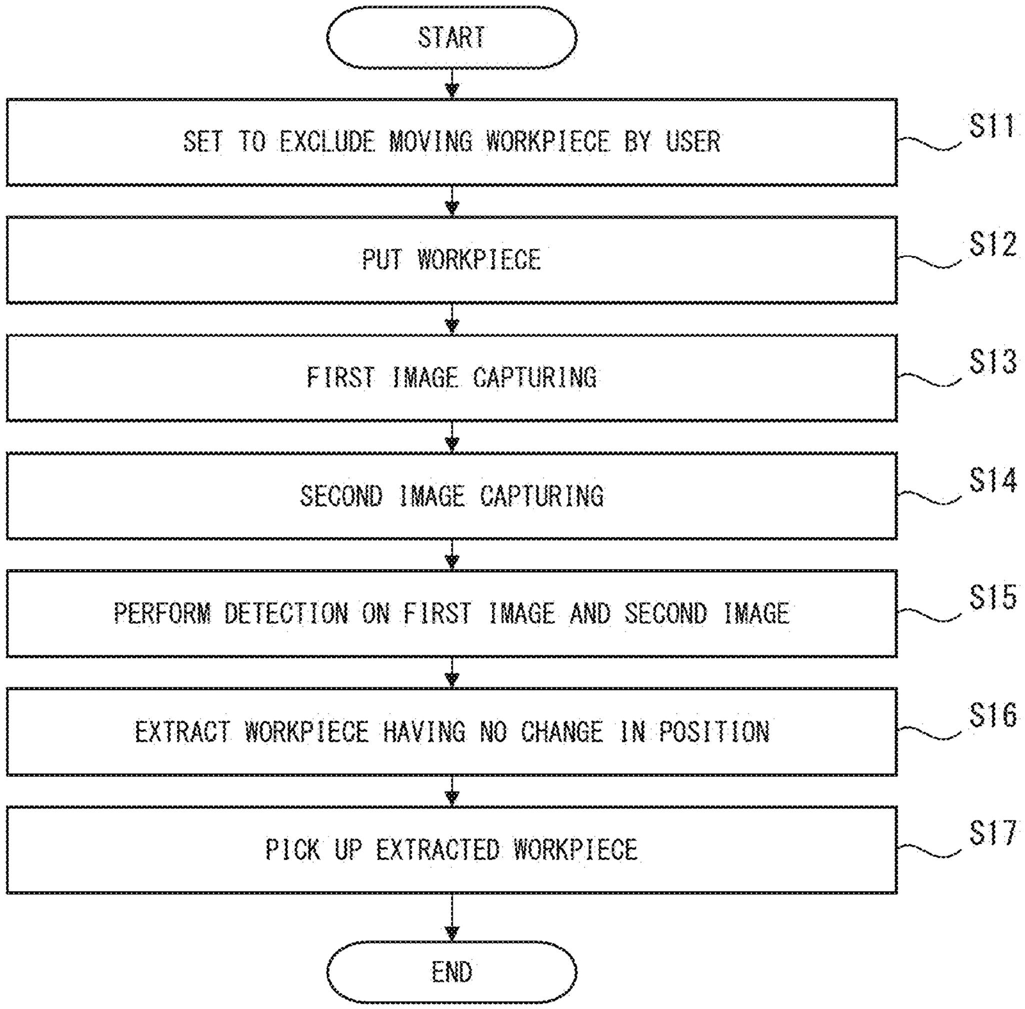
FIG. 8 is a flowchart illustrating a determination operation of a pick-up target according to the second example.

Hereinafter, a second example will be described with reference to FIGS. 7 and 8. FIG. 7 is a diagram illustrating image processing for the target determination unit 122 to determine a workpiece in a stationary state as a pick-up target according to the second example. FIG. 8 is a flowchart illustrating a determination operation of a pick-up target according to the second example. The determination operation of a pick-up target according to the second example will be described with reference to the flowchart in FIG. 8. It should be noted that steps S11 to S14 of the flowchart in FIG. 8 are the same as steps S1 to S4 in the first example.

First, a user performs setting for excluding a moving workpiece from a target of a pick-up operation by the robot 30 (i.e., for setting a workpiece in a stationary state as a pick-up target) (step S11). The setting is accepted via, for example, a UI screen provided by the setting unit 123.

Next, as illustrated in FIG. 7, the workpieces W being tablets of medicine are put in the peripheral apparatus (container) 80 (step S12). The visual sensor 70 is arranged at a position where the visual sensor 70 can captured an image of the workpieces W on the peripheral apparatus (container) 80. The visual sensor 70 successively captures images of the workpieces W. In this way, first image capturing (step S13) and second image capturing (step S14) for the workpieces W are performed. As illustrated in FIG. 7, it is assumed that an image acquired by the first image capturing is an image M11, and an image acquired by the second image capturing is an image M12. Seven workpieces W1 to W7 are captured in each of the images M11 and M12.

The target determination unit 122 performs detection processing for detecting a workpiece on each of the image M11 and the image M12 (step S15). In this way, as a detection result, positions of the workpieces W1 to W7 in the image M11 and positions of the workpieces W1 to W7 in the image M12 can be acquired.

It should be noted that, in a situation where the visual sensor 70 is mounted on the robot 30 and images of workpieces are captured by the visual sensor 70 while the robot 30 is moving, the image capturing position of the visual sensor 70 at which the visual sensor captures an image of workpieces changes, and the position of a target object (stationary target object) in an image changes between two successively captured images. Thus, in such a situation, when a position of a workpiece is calculated as a detection result in step S15, the calculation may be performed in such a way that the position of a stationary target object in an image is the same between the two captured images, by considering a change in the capturing position. Also, in a situation where workpieces are conveyed on a conveyance device and the visual sensor 70 fixed in a workspace captures images of the workpieces conveyed on the conveyance device, the position of a target object stationary on a conveyor belt changes between two successively captured images. Thus, in such a situation, when the position of a workpiece is calculated as a detection result in step S15, the calculation may be performed in such a way that the position of a target object stationary on the conveyance belt in an image is the same between the two captured images, by considering a conveyance speed and the like of the conveyance device.

The target determination unit 122 extracts, as a workpiece in a stationary state, a workpiece having no change in a position between the image M11 and the image M12 among the workpieces W1 to W7, based on the detection result (step S16).

In the present example, it is assumed that positions of the workpieces W2 to W5 change, and positions of the workpieces W1, W6, and W7 do not change. In this case, in step S16, the workpieces W1, W6, and W7 are extracted as workpieces in a stationary state and are notified as a pick-up target to the robot controller 50. The motion control unit 151 of the robot controller 50 performs a pick-up operation on the workpieces W1, W6, and W7 notified from the target determination unit 122 (step S17).

In such a manner, according to the second example, a workpiece in a stationary state can be determined as a pick-up target by the robot 30. In other words, a possibility that the robot 30 attempts to perform the pick-up operation on a moving workpiece and fails can be reduced, and the cycle time of the entire pick-up operation can be shortened.

Figure 9:
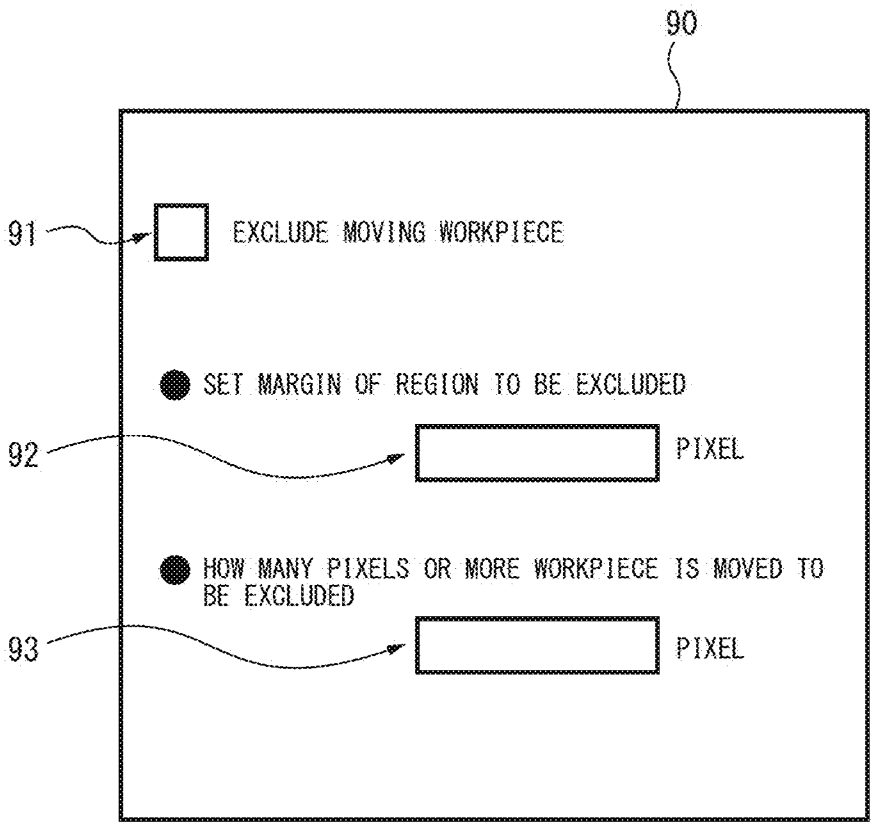
FIG. 9 is a diagram illustrating an example of a UI screen provided by a setting unit.

Next, an example of a UI screen for performing setting related to the operation for determining a workpiece in a stationary state as a target for pick-up by the robot 30 will be described with reference to FIG. 9. FIG. 9 illustrates the example of such a UI screen 90. The UI screen 90 may be generated by the setting unit 123 and displayed on a display screen of the display unit 13 of the teach pendant 10. In this case, an input to the UI screen 90 may be performed via the operation unit 14 of the teach pendant 10.

As illustrated in FIG. 9, the UI screen 90 includes a check box 91 for causing the detection system 100 to perform a pick-up operation in a state where moving workpieces are excluded from a pick-up target. By checking the check box 91, the operation of picking up workpieces in a state where moving workpieces are excluded from a pick-up target as described in the first example and the second example can be performed. It should be noted that the UI screen 90 may be provided with a selection field for specifying which of the operation in the first example and the operation in the second example is performed.

The UI screen 90 may further include a specification field 92 for specifying a size (pixel number) of a margin when a non-target region for detection is set by adding a margin to a pixel region of a moving workpiece in a case of the operation in the first example.

The UI screen 90 may further include a specification field 93 for specifying how many pixels or more a workpiece is moved between successively captured images to exclude the workpiece from a work target. The specification field 93 may be applied to both of a case where a workpiece changing between the image M1 and the image M2 is to be excluded in the first example and a case where a workpiece changing between the image M11 and the image M12 is to be excluded in the second example. It should be noted that in the specification field 93 exemplified herein, a position (pixel number) in an image can be specified as the amount of a movement of a workpiece to be excluded from a work target, but the specification field 93 may be configured such that a position (for example, millimeter) in a real space can be specified as the amount of a movement of a workpiece to be excluded from a work target. Alternatively, when a movement amount of a workpiece to be excluded is input by a pixel number to the specification column 93, a value acquired by converting the pixel number into a movement amount in a real space may be displayed so that the movement amount in the real space can be confirmed.

As described above, according to the present embodiment, it is possible to prevent occurrence of wasteful time due to the fact that a robot attempts to pick up a workpiece before a position and a posture of the workpiece are stable and fails to pick up the workpiece. In other words, a workpiece in a stationary state can be set as a pick-up target, a possibility of pick-up failure can thus be reduced, and the cycle time of work by a robot can be shortened.

The present invention has been described above by using the typical embodiments, but it will be understood by those of ordinary skill in the art that changes, other various changes, omission, and addition may be made in each of the embodiments described above without departing from the scope of the present invention.

The embodiments described above can be applied to not only a handling system by a robot but also a system of various industrial machines that can improve efficiency of work by setting a workpiece in a stationary state as a target for the work.

In the embodiments described above, the example of extracting a workpiece, such as a tablet, having a stable position and a stable posture and setting the extracted workpiece as a target for pick-up is described, but the embodiments described above can also be applied to, for example, work for extracting a container (such as a bottle) having a stable position and a stable posture and being conveyed on a conveyance device and cramming workpieces into the container by a robot.

In the detection system 100 described in the first example or the second example described above, the visual sensor 70 may be preset in such a way as to successively capture images of the workpieces W, and the target determination unit 122 may be configured to automatically extract a workpiece in a stationary state based on successive images acquired from the visual sensor 70 so as to enable the robot 30 to perform the pick-up operation for the workpiece in a stationary state. In this case, a user does not need to perform an operation for generating a trigger signal that causes the visual sensor 70 to operate and invokes processing of performing the pick-up operation when workpieces are put in a container and the like.

In the first example and the second example described above, the operation of extracting a workpiece in a stationary state, based on two successively captured images, is described, but a workpiece in a stationary state may be extracted based on three or more successively captured images. When a workpiece in a stationary state is extracted based on three or more successively captured images, for example, workpieces with a movement between a first captured image and a third captured image and workpieces with a movement between a second captured image and the third captured image may be extracted, and the detection processing may be performed in a state where the extracted workpieces are excluded from the latest image (third captured image).

The UI screen described with reference to FIG. 9 may include a setting of an image capturing cycle at which images of workpieces are successively captured by the visual sensor. In this case, a user can set an appropriate image capturing cycle according to a property of a workpiece being a work target.

An arrangement of the functional blocks in the functional block diagram described in FIG. 3 is an example, and various modification examples of an arrangement of the functional blocks are possible. For example, a configuration example in which at least one of the image acquisition unit, the target determination unit, and the setting unit arranged in the visual sensor controller 20 is arranged on the robot controller 50 side is also possible.

The functional blocks of the visual sensor and the robot controller illustrated in FIG. 3 may be achieved by executing various types of software stored in a storage device by the processor of the visual sensor and the robot controller, or may be achieved by a configuration in which hardware such as an application specific integrated circuit (ASIC) is a main body.

The program for executing various types of processing such as the determination processing of a pick-up target (FIGS. 6 and 8) in the embodiments described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

10 Teach pendant
20 Visual sensor controller
30 Robot
33 Hand
50 Robot controller
70 Visual sensor
80 Peripheral apparatus
100 Detection system
11, 21, 51 Processor
12, 22, 52 Memory
13, 23 Display unit
14, 24, 54 Operation unit
15, 53, 25 Input/output interface
121 Image acquisition unit
122 Target determination unit
123 Setting unit
151 Motion control unit

The invention claimed is:

1. A controller comprising:
a processor configured to:
acquire, from a visual sensor, a plurality of images of workpieces successively captured by the visual sensor; and
determine a workpiece in a stationary state as a target for work by an industrial machine, based on the plurality of images,
wherein
the processor is further configured to:
perform image processing of extracting a moving workpiece, based on the plurality of images, and removing the moving workpiece from a latest image among the plurality of images,
perform detection processing for detecting a workpiece on the latest image in which the moving workpiece is excluded, and
determine, as the target for the work, a workpiece detected by the detection processing.

2. The controller according to claim 1, wherein
the image processing includes mask processing of masking a region including the moving workpiece on the latest image, and
the processor is configured to perform the detection processing on the latest image subjected to the mask processing.

3. The controller according to claim 1, wherein
the processor is further configured to set a parameter used in the image processing, wherein
the parameter includes at least one of
a first parameter for setting how many pixels or more a workpiece is moved between successive images among the plurality of images to extract the workpiece as the moving workpiece, and
a second parameter for setting a size of a margin region needed to be added to, as a region to be excluded from the latest image, a periphery of a pixel region of the moving workpiece.

4. A detection system comprising:
a visual sensor; and
a processor configured to acquire, from the visual sensor, a plurality of images of workpieces successively captured by the visual sensor, and
determine a workpiece in a stationary state as a target for work by an industrial machine, based on the plurality of images, wherein
the processor is further configured to:
perform image processing of extracting a moving workpiece, based on the plurality of images, and removing the moving workpiece from a latest image among the plurality of images,
perform detection processing for detecting a workpiece on the latest image in which the moving workpiece is excluded, and
determine, as the target for the work, a workpiece detected by the detection processing.

5. The detection system according to claim 4, wherein
the image processing includes mask processing of masking a region including the moving workpiece on the latest image, and the processor is configured to perform the detection processing on the latest image subjected to the mask processing.

6. The detection system according to claim 4, the processor is further configured to set a parameter used in the image processing, wherein the parameter includes at least one of a first parameter for setting how many pixels or more a workpiece is moved between successive images among the plurality of images to extract the workpiece as the moving workpiece, and a second parameter for setting a size of a margin region needed to be added to, as a region to be excluded from the latest image, a periphery of a pixel region of the moving workpiece.

* * * * *